United States Patent [19]

Hemming, Jr. et al.

[11] 4,174,237

[45] Nov. 13, 1979

[54] PROCESS AND APPARATUS FOR CONTROLLING THE SPEED OF WEB FORMING EQUIPMENT

[75] Inventors: Frank E. Hemming, Jr., Washingtonville, N.Y.; Stuart A. Johnson, Denville, N.J.

[73] Assignee: International Paper Company, New York, N.Y.

[21] Appl. No.: 921,834

[22] Filed: Jul. 3, 1978

[51] Int. Cl.² .............................................. B32B 31/00

[52] U.S. Cl. ...................................... 156/64; 156/205; 156/361; 156/378; 156/470; 318/59; 318/67; 318/69; 318/72; 364/471

[58] Field of Search ............... 156/350, 351, 361, 378, 156/64, 205, 470, 368; 318/59, 67, 69, 72, 318, 326, 344; 364/469, 471, 472, 110; 226/118, 119, 44

[56] References Cited

U.S. PATENT DOCUMENTS

| | | | |
|---|---|---|---|
| 3,465,223 | 9/1969 | Mears | 318/72 |
| 3,644,806 | 2/1972 | Belson et al. | 318/72 X |
| 3,893,178 | 7/1975 | Sordello | 318/318 X |
| 3,966,518 | 6/1976 | Ferara | 156/205 X |
| 3,970,489 | 7/1976 | Schmidt | 156/361 X |
| 3,977,929 | 8/1976 | Evans | 156/205 X |
| 3,981,758 | 9/1976 | Thayer et al. | 156/64 |

*Primary Examiner*—David A. Simmons
*Attorney, Agent, or Firm*—Donald E. Degling

[57] ABSTRACT

A speed control system is provided for apparatus and process for shaping and treating web material of indefinite length wherein the apparatus includes a master processing unit, one or more slave processing units communicating with the master unit through web storage or buffer means and a computer. Information as to the desired speed and mode of operation of the master unit and the mode of operation of the slave units is inputted to the computer which communicates with the drive motors of the master and slave units through special buffered isolated amplifiers and automatically controls the speed of the slave units so as to maintain the desired quantity of partially processed web material in the web storage means and to maintain the selected operating speed of the master unit.

10 Claims, 5 Drawing Figures

FIG. 4
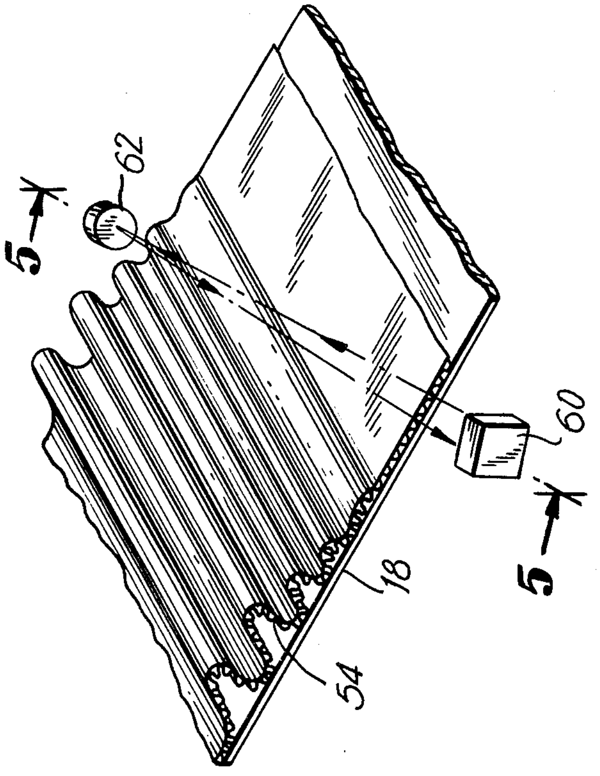
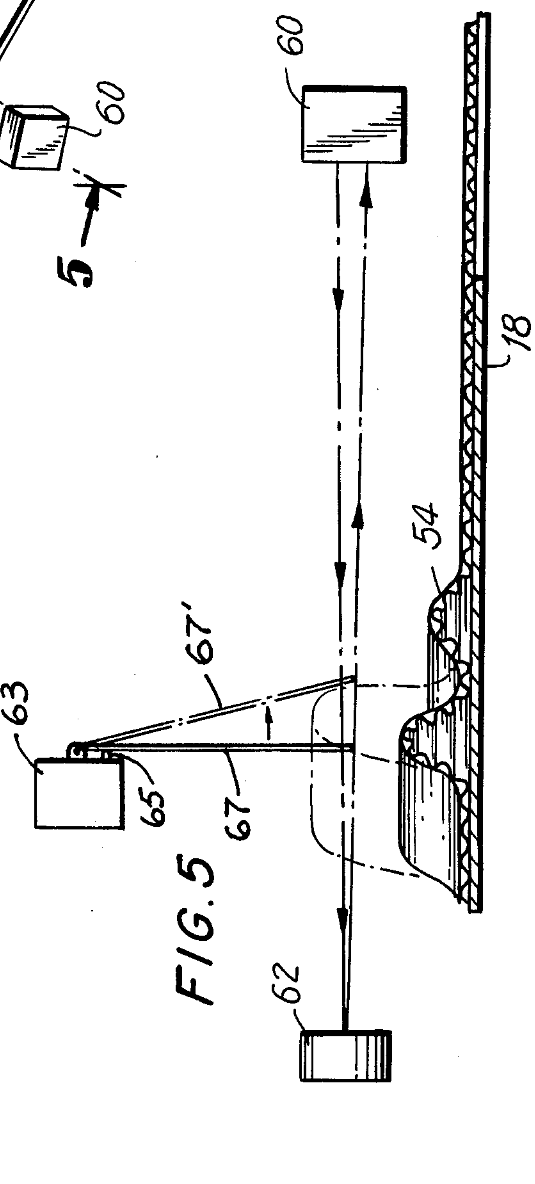
FIG. 5

PROCESS AND APPARATUS FOR CONTROLLING THE SPEED OF WEB FORMING EQUIPMENT

BACKGROUND OF THE INVENTION

1. Field of the Invention

This invention relates generally to shaping and treating processes for web type materials of indefinite length and, more specifically, to an improved process and apparatus for producing corrugated paper products by laminating one or more flat paper webs to one or more corrugated paper webs.

2. Description of Prior Art

Processes and equipment for the manufacture of products such as corrugated paper board are well known in the paper industry. In general, these processes involve forming a web of corrugated paper by passing a flat web through corrugating rolls and laminating the corrugated web to the flat web in a machine known as a Single Facer. A second flat web may then be laminated to the opposite face of the corrugated web to form a double faced board in a machine known as a Double Backer or Double Facer. See, for example, Langston U.S. Pat. No. 2,482,627 and McKee U.S. Pat. No. 2,568,349. The double faced web may then be passed through additional processing equipment such as a Slitter/Scorer which slits a web to appropriate dimensions and applies the desired score marks to form fold lines where needed in the event that the corrugated paper board is destined for use as a container or other folded product.

While double faced corrugated paper board is a common product, a number of variations may be desired. These variants may range from single faced corrugated paper to products employing two or more corrugated webs and three or more flat webs to form multiple thickness corrugated boards.

In addition, it may be desired to produce corrugated paper board having flutes of different sizes or multiply corrugated paper board where the flutes of one ply are different in size from the flutes of another ply.

In order to provide such varying end product capabilities, it is frequently desirable to have several Single Facer machines or slave units interconnected with the Double Backer machine or master unit. See, for example, Evans U.S. Pat. No. 3,977,929. In such a compound processing line it will be apparent that the productivity of the line depends upon the operating speed of the Double Backer or master unit, and it is therefore desirable to control the components of the apparatus so that the Double Backer or master unit operates continuously, or nearly continuously, at the optimum speed. However, it is customary to provide web material such as paper used for the corrugated medium and liner in roll form. As each roll of web material becomes exhausted, it is necessary to slow down the roll stand containing that roll to permit splicing a fresh roll of web material. It has been customary, in order to permit the overall process to continue to operate, to provide a storage or buffer area known as a bridge between each Single Facer machine and the Double Backer machine. In anticipation of a splicing operation, for example, the Single Facer operating speed can be increased to provide an inventory of partially processed web material in the storage or buffer area. Then, when the Single Facer is slowed down for the splicing operation, the Double Backer can continue to operate by withdrawing web material as required from the storage or buffer area. See, for example, Schmidt, et al U.S. Pat. No. 3,970,489. Web speed measurements may be made by means of electrical or mechanical tachometers, see, e.g. Schmidt, et al U.S. Pat. No. 3,970,489 and Stewart, et al U.S. Pat. No. 3,104,997. It is also known to provide means for monitoring the quantity of material on the bridge by measuring the rate at which material is delivered to and withdrawn from the bridge, see Ferara U.S. Pat. No. 3,966,518.

Due to the many operating variables encountered in the overall process, it will be appreciated that each drive unit in the process must be capable of operating at a range of speeds between zero and a maximum and that the optimum speed may be affected by several different factors. Moreover, it is important that when speed changes are required the change should be accomplished smoothly but rapidly so that excessive forces are not generated which may shorten the life of the mechanical equipment or cause undue stress in the web material. At the same time, the changes should be accomplished in as short a time as possible to permit the system quickly to return to a normal mode.

SUMMARY OF THE INVENTION

Applicants have developed a process control drive system applicable to processes for shaping and treating web materials of indefinite length incorporating a master unit and one or more slave units wherein the master unit is maintained at a uniform preselected speed for each of its drive modes while the slave units are operated in a sequence of modes with a smooth and responsive control as either speed or mode changes are effected. During the varying speed and mode changes of the slave units, a minimum variation in storage or buffer inventory is involved.

In accordance with applicant's invention, the master unit for a web of material may be maintained in any one of several predetermined modes and at any preselected speed within a range of speeds when operated in the "normal" mode. Each of the slave units may be operated at any one of several modes and at various speeds within each mode. The master unit and slave units are actuated from consoles by the operator or by remote computer means. The consoles communicate with the respective operating units through a computer and special buffered isolated amplifiers. Information as to the speed of each slave unit and the speed of the final web from the master unit is inputed to the computer together with information as to the presence or absence of web material at a selected point on each of the storage web means. As will be pointed out in more detail below, applicant's process control system adjusts the speed of each of the slave units, taking into consideration the required modes of operation for the slave units, so that the master unit can be maintained at the optimum speed for each of its modes without excessive variation of the quantity of web material contained in the storage means.

Further details of the invention will become apparent to those skilled in the art from the following detailed description of the invention and the drawings in which:

FIG. 4 is a perspective view of a portion of the bridge of FIG. 1 showing the relationship between the photocell sensing system and the web material stored on the bridge;

FIG. 5 is a view taken along lines 5—5 of FIG. 4 showing, in elevation, the relationship between the photocell sensing system and the web material stored on the bridge. FIG. 5 also shows an alternative mechanical detector for sensing the presence or absence of web material on the bridge.

DETAILED DESCRIPTION

Figure 1:
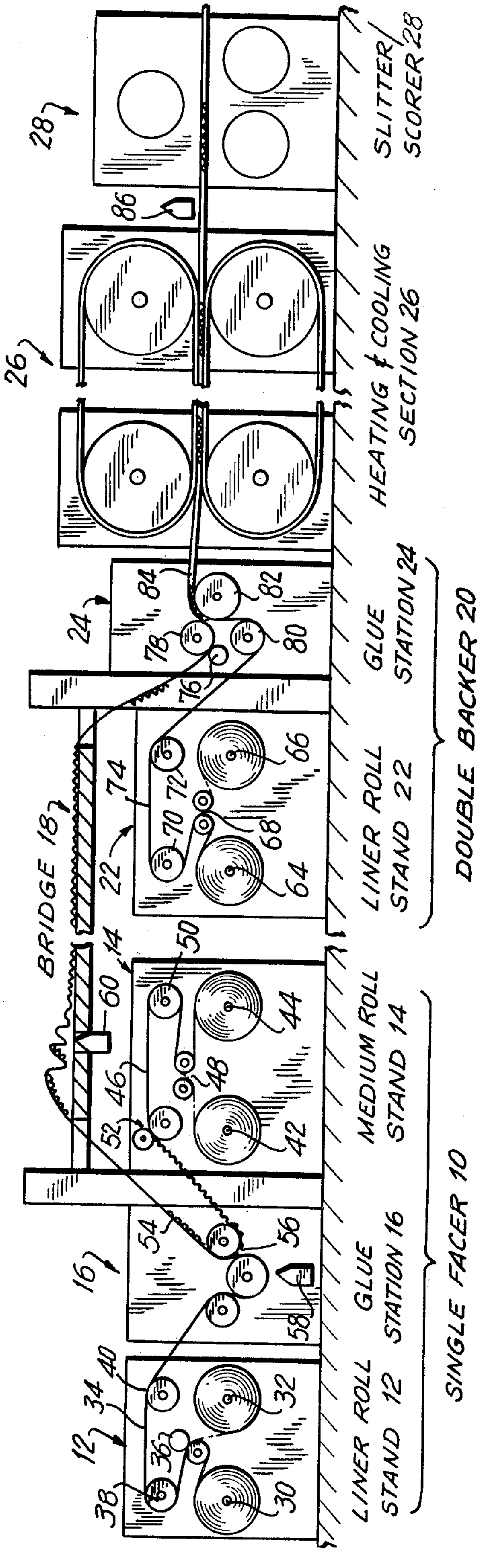
FIG. 1 is a schematic drawing showing equipment for producing 3-ply corrugated paper in accordance with the present invention.

The present invention will be described specifically with respect to apparatus for producing corrugated paper board products by laminating flat paper webs to a corrugated paper medium. A typical apparatus for the production of corrugated paper is shown schematically in FIG. 1 to which reference is now made. The Single Facer is indicated generally at 10 and comprises a liner roll stand 12, a medium roll stand 14 and a glue station 16. The output of the Single Facer 10 comprises a web of flat material glued to a corrugated medium. The web from the Single Facer is delivered to, and temporarily stored upon, a bridge or buffer means 18 positioned between the Single Facer 10 and the Double Backer 20. The Double Backer 20 comprises a liner roll stand 22 and a glue station 24. In the Double Backer 20 a second web of flat material is glued to the opposite side of the corrugated medium to form a 3-ply corrugated board having flat paper webs on the sides and a corrugated medium between the webs. The web of corrugated board may then be processed in an appropriate heating and cooling section 26 and finally passed through a slitter/scorer 28 to produce completed sheets of corrugated board. It will be appreciated that the equipment referred to above is illustrative of the type of web processing equipment to which the present invention may be applied and that the invention is not limited to the particular types of equipment shown or to the particular sequence of process steps shown.

Referring now in more detail to the Single Facer 10 and particularly to the liner roll stand 12, the stand 12 is equipped with a pair of spindles 30, 32 which carry rolls of flat web material 34. In the present case, the web material 34 may be liner paper and is fed alternately from the spindles 30, 32 through appropriate drive rolls 36 and guide rolls 38, 40 into the glue station 16. It will be appreciated that as one roll of web material is exhausted, the roll stand 12 must be slowed down to a splicing speed or mode to permit splicing the leading end of a fresh roll of web material to the trailing end of the exhausted roll. Thereafter, a fresh roll of web material may be mounted on the appropriate spindle and the process repeated as necessary to maintain the corrugator line in continuous operation.

In similar fashion, the medium roll stand 14 comprises a pair of spindles 42, 44 adapted to carry rolls of flat web material suitable, in this case, for forming into a corrugated medium. The web material 46, is fed alternately from spindles 42, 44, through drive rolls 48 around guide rolls 50 and through corrugating rolls 52. The corrugated medium then enters the glue station 16 where glue is applied to the flutes of the now corrugated web material 46 and these flutes are brought into contact with the liner 34 to form a single-faced web of corrugated material 54. The gluing and contacting rolls are indicated schematically at 56. A speed sensor 58, which may be a tachometer or other device, is provided to measure the speed of the web through the Single Facer 10, or to give a contact, pulse or pulse count from which the speed may be computed by computer 98.

The single-faced web 54 is delivered from the Single Facer 10 to a bridge or web storage means 18 which comprises a relatively long flat surface upon which the single-faced web may be stored temporarily in the form of loose loops. The size of the loops is determined by the physical characteristics of the web material and may easily be established by trail.

As shown more clearly in FIGS. 4 and 5, a photocell 60 may be mounted on one side of the bridge 18 near the entry end thereof and somewhat above the surface of the bridge. On the opposite side of the bridge, but not directly opposite the photocell, a reflector 62 is positioned. The reflector 62 is also located above the surface of the bridge 18 as shown in FIG. 5. If desired, the reflector 62 may be located somewhat closer to the surface of the bridge 18 than is the photocell 60. It will be appreciated that as the single-faced web material 54 is delivered to the bridge 18, the material will double up as folds or loops which will gradually be pushed down the flat surface of the bridge means until the whole surface of the bridge becomes filled with looped material. The loops normally will be of approximately the same size, depending upon the characteristics of the web material, so as to provide a generally constant depth of material on the bridge surface. As the web material 54 is withdrawn from the bridge at the opposite end thereof, the loops will straighten out sequentially toward the entry end of the bridge. The photocell 60 and the reflector 62 are positioned above the surface of the bridge but below the normal level of the top of the loops formed by the web material. Thus, if a signal from the photocell 60 is reflected by the reflector 62, the signal will be an indication that there is no loop of web material present between the photocell and the reflector, i.e. a "low bridge" signal. The photocell 60 and the reflector 62 are offset in the longitudinal direction to prevent a false signal which might otherwise be received if the photocell beam passed between loops, or within a loop, of the web material 54. Alternatively, it will be appreciated that if the photocell 60 and reflector 62 are offset in the vertical direction above and below the normal position of the tops of the loops of web material 54 on the bridge 18, a reflected signal will indicate the absence of a loop between the photocell and the reflector.

The "low bridge" indication may be produced by means other than the photocell sensing means shown in FIG. 4. One such alternative is the mechanical switch assembly 63 shown in elevation in FIG. 5. The mechanical switch assembly 63 includes a microswitch 65 and an arm 67 mounted for oscillatory motion on the switch assembly 63. The presence of a loop of material will move the arm 67 to the position shown in broken lines 67' while if there is no loop present, the arm will assume the position shown by the solid lines 67 and will actuate the microswitch 65 to cause a "low bridge" signal to be transmitted.

The photocell and reflector 60, 62 or the mechanical switch assembly 63 is preferably located at such a point on the bridge 18 that the "low bridge" signal may be transmitted when the bridge still contains about 50 feet of looped single-faced web material 54. The "low bridge" signal also serves as a correction for the bridge inventory calculated by the computer 98 as the difference between the length of the material passing through the Single Facer 10 and the Double Backer 20. Such a correction is necessary because of the possibility that the web material 54 may slip with respect to the rolls of the Single Facer and/or Double Backer. On the basis of the "low bridge" signal, the drive for the associated Single Facer 10 will be speeded up for a predetermined time to build up the bridge inventory to the desired level, for example, 100 feet of web material. In order to obviate the need for a corresponding "high bridge" signal, a bias may be built into the Single Facer speed signal so that the actual speed of the Single Facer will be slightly less than the computed speed. The effect of this bias will be to cause the bridge inventory gradually to drop until another "low bridge" signal is induced.

Single-faced web material 54 may be withdrawn from the exit end of the bridge means 18 and entered into the Double Backer 20 as shown schematically in FIG. 1. The Double Backer 20 includes a liner roll stand 22, functionally similar to the liner roll stand 12, which comprises a pair of spindles 64, 66 adapted to carry rolls of flat web material such as liner paper. Liner paper 74 may be fed alternately from each of the spindles 64, 66 through drive rolls 68 and around guide rolls 70, 72 into the glue station 24. Within the glue station 24 glue is applied to the flutes of the single-faced web material 54 by a glue roll 76 as the web material 54 passes around guide roll 78. Liner paper 74 passes around guide roll 80 in the glue station 24 and is brought into adhesive contact with the single-faced material 54 as both webs pass through the nip between guide roll 78 and contact roll 82. The 3-ply corrugated web 84 thereupon leaves the glue station and passes through appropriate heating and cooling means 26 to complete the processing of the corrugated web.

The completed 3-ply corrugated web 84 may be passed through the slitter/scorer apparatus 28 which is adapted to slit the web into finished sheets of corrugated board appropriately scored for the desired end use. If desired, an appropriate stacking apparatus (not shown) may be added after the slitter/scorer means 28. A tachometer or contact, pulse, or pulse counter from which the speed may be found by computer 98, or another type of speed sensing means 86 may be located at any desired point along the path of travel of the 3-ply corrugated web 84 to measure the speed of the web passing through the Double Backer 20 and the remainder of the processing equipment. Preferably, the speed sensing means 86 will be a sensor of the type which makes a physical contact with the web so that the lack of input along with computer means of determining expected input immediately indicates the absence of web material at the measuring point in the event of web breakage during the operation of the machine.

The Single Facer 10, the bridge means 18, the Double Backer 20, the heating and cooling section 26 and the slitter/scorer 28 are all well known devices and, therefore, it is deemed unnecessary to describe them in further detail. As has been pointed out above, the Single Facer and Double Backer equipment may be combined in other arrangements than that shown schematically in FIG. 1 to produce, for example, products having an excess of 3-plies of web material without departing from the scope of the present invention. For each additional Single Facer and bridge, the devices used by this invention are repeated with the exception of the Double Backer associated devices and the computer devices.

It will be appreciated that there is an optimum speed of operation for the equipment shown in FIG. 1 which will result in the most efficient production of the end product. However, this speed may vary depending upon the nature of the material being produced as well as the quantity of the run. In general, in order to maintain uniform quality, it is desirable to operate at a constant speed and to maintain as constant an inventory of material on the bridge as is possible.

Figure 2:
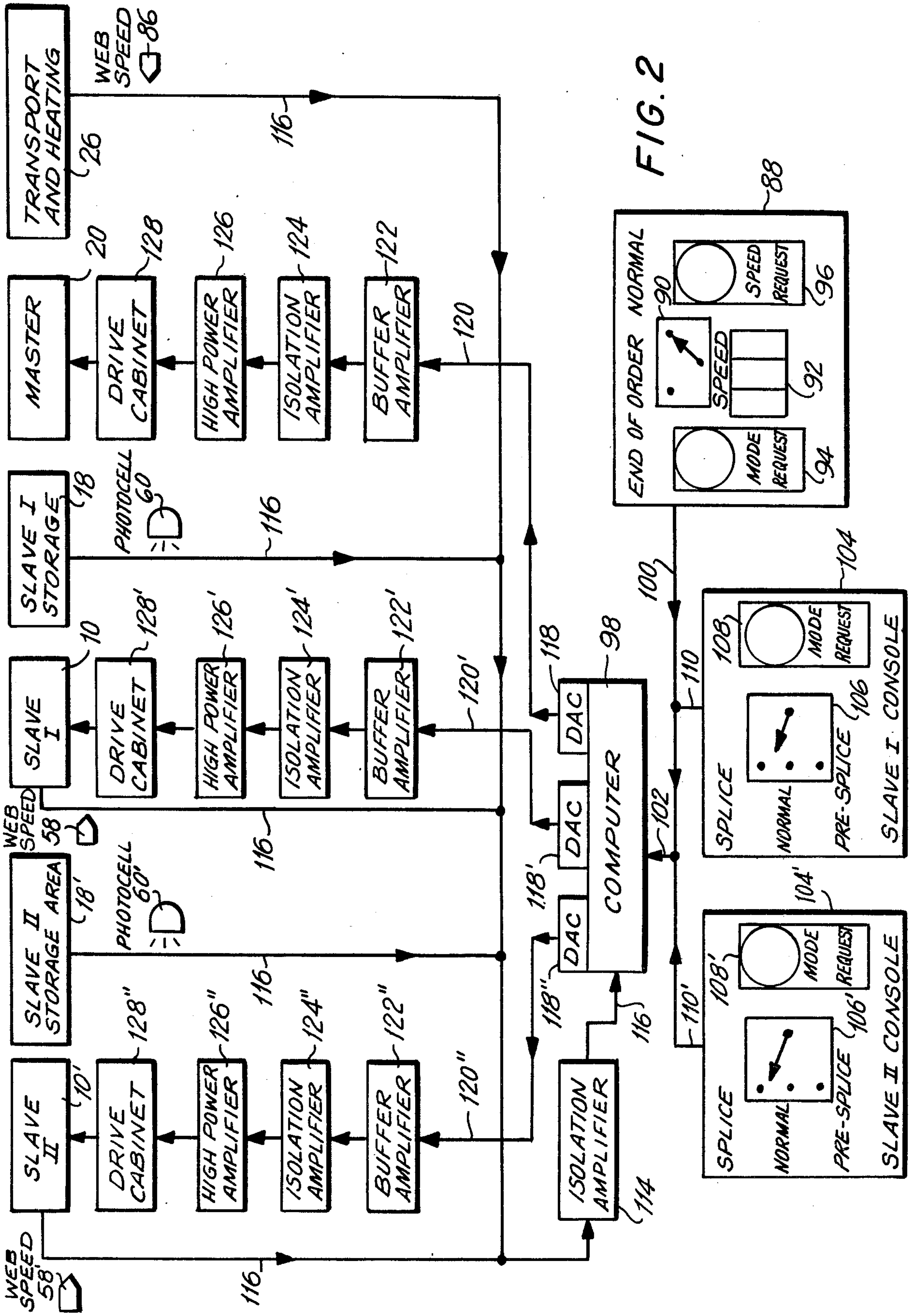
FIG. 2 is a block diagram showing the relationship between the master unit and two slave units in accordance with the present invention.

The Double Backer 20 is required to operate in three modes: first, a "normal" mode or speed determined by the nature and quantity of the material being produced, second, an idle or "end of order" speed and third, a "dive to save" mode—initiated, for example, by an imminent bridge "runout" during the splice mode of any Single Facer. The occurrence of this third mode is found by computer means, and the Double Backer is slowed to a speed below the Single Facer splice speed so as to not "break the bridge", or "runout" of web material in the buffer or bridge area. Referring to FIG. 2 which shows schematically the control system for one master unit and two slave units, a main console 88 is provided upon which are mounted the controls for the master or Double Backer machine. The console 88 includes a mode control switch 90, a digital speed control 92, a mode request actuator 94, and a speed request actuator 96. In operation, the desired mode, and in the case of the normal mode, the desired speed, is selected by the operator. This information may be inputted to the computer 98 through conductor 100, 102 by means of the mode request actuator 94 and the speed request actuator 96. For convenience of illustration and description, the console inputs to the computer 98 are shown as a single conductor 100, 102 although, in practice, it is to be understood that each input signal is directed to a separate port of the computer 98.

The Single Facer or slave units 10, 10' are required to operate in any one of four modes: a "normal" speed determined by the normal operating speed selected by the operator for the Double Backer or master unit; a "pre-splice" mode or speed which exceeds the normal speed; a "splice" mode or speed which is a relatively low speed and an idle or "end of order" speed. Referring to FIG. 2, one or more slave consoles 104, 104' is provided upon which are mounted the controls required for the slave or Single Facer machines. The consoles 104, 104' includes a three-position mode control switch 106, 106' and a mode request actuator switch 108, 108'. In operation, the desired mode is selected by the mode control switch 106, 106' and this information is then inputted to the computer 98 through conductors 110, 110' and 102. As noted above, only a single conductor 110, 110', 102 is shown for the console inputs to the computer. In practice, of course, a separate conductor would be employed for each input signal and these separate conductors would be directed to separate input ports of the computer.

The remaining input information to the computer relates to the operating speed of the master or Double Backer unit 20 sensed by the tachometer or other means 86 located at some point beyond the Double Backer, the operating speed of each slave or Single Facer machine 10, 10' sensed by the tachometer or other means 58, 58', and the "low bridge" signal sensed by the photocell 60, 60' or the mechanical switch assembly 63. These signals are inputted to the computer 98 through an isolation amplifier 114 via conductors 116. Again, each input signal is in practice inputted to a separate port of the computer 98. It is possible to connect computer 98 to a master computer (not shown) which is capable of making the decisions currently referred to as being made by the operator. Such a master computer will usually be of greater power and size than computer 98 and will control computer 98 by high speed asynchronous means.

Computer 98 is preferably a digital type microprocessor such as an Intel 8080 having a random access memory (RAM) in addition to a read only memory (ROM). The output of the computer 98 is converted from digital to analog form in the digital to analog converter units (DAC) 118, 118', 118", one of which is provided for each master and slave unit. From each DAC unit 118, 118' or 118" the analog signal is fed by a conductor 120, 120', 120" sequentially to a buffer amplifier 122, 122', 122", an isolation amplifier 124, 124', 124", a high power amplifier 126, 126', 126" and finally to the drive cabinet 128, 128', 128" which includes appropriate electrical motors mechanically connected so as to drive, respectively, the master unit 20 and the slave units 10, 10'. The motor drives are preferably of the D.C. control type known to the art and which need not be described in detail here. The interface between the computer 98 and the drives 128, 128', 128", however, is shown in more detail in FIG. 3 to which reference is now made. As the interface between the computer and the drive is similar for both the master and slave units, only one interface will be described in detail.

Computer 98 is capable of deriving a number between 0 and 255, for example, proportional to the speed of the drive which it controls and outputting this signal in pure binary form on, for example, 8 binary lines. It will be appreciated that in binary notation, the integer numbers from 0 to 255 may be expressed by 8 binary digits while larger numbers require additional binary digits. An example of this function of the computer is shown in the table below which sets forth the relationship between machine speed, derived numerical speed and the 8 bit binary equivalent:

TABLE 1

| Machine Speed | Derived Numerical Speed | Binary Equivalent |
|---|---|---|
| stopped | 0 | 00000000 |
| ¼ speed | 64 | 01000000 |
| ½ speed | 128 | 10000000 |
| ¾ speed | 192 | 11000000 |
| full speed | 255 | 11111111 |

As shown in the table, zero machine speed is given a value of 0 on the derived numerical speed scale while full speed is given a value of 255 on the derived numerical speed scale. Intermediate speeds are, of course, proportional. The speed values in derived numerical form may then be converted by the computer using well-known techniques into 8 bit pure binary numbers. Such information in binary form may then be processed appropriately by the computer and outputted on the 8 bit port of the computer. It will be appreciated, of course, that additional binary digits may be employed, if desired, in order to produce a smaller interval between the discrete speeds available from the digital control system.

Figure 3:
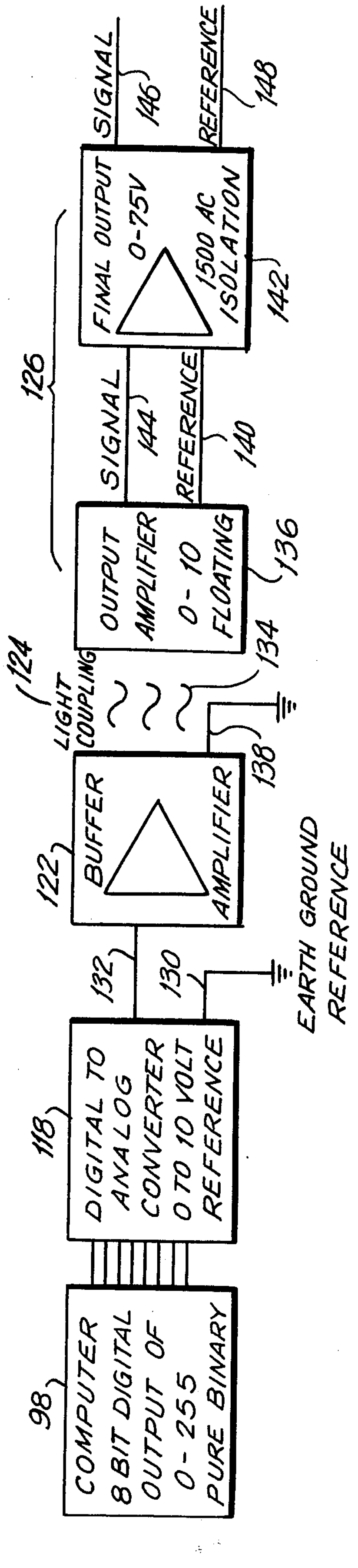
FIG. 3 is a block diagram of the computer controlled drive system according to the present invention used to drive the master and slave units as shown in FIGS. 1 and 2.

The first block in the diagram of FIG. 3 represents the function of the computer 98 by which a derived speed number in the range of 0 to 255 is outputted as an 8 bit pure binary number. The 8 bit information is fed into the digital to analog converter 118 where it is transformed, for example, into a linear D.C. voltage between 0 and 10 volts, where 10 volts represents full machine speed and 5 volts represents ½ speed. It will be appreciated, of course, that other D.C. voltage ranges may be used. The digital to analog converter 118 is grounded to earth reference 130 and the output 132 fed to a buffer amplifier 122 which produces an equivalent light beam 134 proportional to the input signal 132 of the buffer amplifier 122. The output amplifier 136 therefore produces a D.C. voltage in the same range as that of the DAC converter 118, in this instance between 0 and 10 volts. However, while the buffer amplifier 122 is grounded to earth reference at 138, the output amplifier 136 is isolated by the light coupling 124 and may, therefore, be regarded as having a "floating" reference.

In practice, the reference 140 for the output amplifier 136 is tied to the high power output amplifier 142. The 0 to 10 volt D.C. signal 144 from the output amplifier is multiplied by the high power amplifier 142 to the desired D.C. control voltage 146. As shown in FIG. 3, the D.C. control voltage corresponding to 10 volts input is adjustable to 75 volts D.C. and the reference voltage 148 is isolated to a maximum of 1500 volts A.C. above earth ground. It will be appreciated that by the use of the present isolated amplifier interface, various D.C. control voltages may be used with any desired A.C. reference. Thus, for example, the system has been operated with a 0 to 20 volt D.C. control floating on a 460 volt A.C. reference. In another pilot test, a 0 to 46 volt D.C. control was used with no A.C. offset.

To operate a system of the type shown in FIGS. 1 through 3, the desired normal or base operating speed is fed into computer 98 by means of the digital speed control 92 and the speed request actuator 96. The computer 98 will thereupon send a signal through the DAC 118, buffer amplifier 122, isolation amplifier 124 and high power amplifier 126 which will then apply the appropriate D.C. control voltage to the motor controls of the Double Backer 20 so as to accelerate the Double Backer quickly and uniformly to the desired speed. The actual speed will be sensed by the tachometer or other means 86 and fed back to the computer where it will be compared with the desired speed. Appropriate action will be taken by the computer to maintain a control signal until the desired speed is attained and maintained. Simultaneously, the computer 98 will select a corresponding speed for the Single Facer 10 and send an appropriate signal through the amplifier system comprising the buffer amplifier 122', isolation amplifier 124' and high power amplifier 126' to the drive unit 128'. Again, the speed of the Single Facer 10 will be sensed by the tachometer or other means 58 and sent to the computer 98 which will compare the sensed signal with the desired speed and apply corrections if required.

The analog speed control system here disclosed, provides for a more rapid yet smooth acceleration and deceleration then is possible with the existing pulsing method of control and thus decreases the quantity of material required to be stored on the bridge 18 during splicing operations. The present speed control also decreases the total time during which the Single Facer 10 is operated in a splice mode. Closer control of the quantity of material on the bridge will reduce warping of the material and hence reduce machine waste. Another effect of the smooth yet rapid speed control is an increase in the life of the motors and controls as a result of the absence of "pulsing" which induces abnormal mechanical forces into the motors and drive train.

It is desired that the bridge 18, 18' maintain a relatively constant inventory of single face material 54. This is accomplished by the photocell 60, 60' or mechanical switch assembly 63 which sends a signal to the computer 98 whenever the inventory of material falls below a predetermined minimum. On the basis of this signal, the computer adjusts the speed of the Single Facer 10, 10' to increase the bridge inventory. When operating in the "normal" mode the speed of the Single Backer desirably may be limited to within 50 feet per minute of the Double Backer speed.

In accordance with earlier computer control systems relating to corrugator machines, such as the "Corrugator Monitoring and Control Program for System/7" No. 5798-NBN published Dec. 13, 1974 by IBM General Systems Division and relating to a joint development by IBM and applicants' assignee, it is known to use a proximity switch or photosensor on the roll stand of a Single Facer or Double Backer machine to sense or measure the roll diameter and to use this information together with web speed to predict, for example, the "end of roll" condition. Such computer generated information or direct observation may be utilized as an input signal in the present case to advise the operator of the need, or desirability, of changing the mode of operation of the Single Facer from the "normal" mode to the "pre-splice" mode, from the "pre-splice" mode to the "splice" mode, or from the "splice" mode to the "normal" mode. As the "end of roll" determination, as such, forms no part of the present invention, it is neither shown nor described herein.

When a splicing operation on the Single Facer 10 or 10' is anticipated, the Single Facer must first be operated in the "pre-splice" mode which is a predetermined speed in excess of the "normal" speed determined by the Double Backer speed. During operation in the "pre-splice" mode, the quantity of single-face material 54 contained on the bridge 18 or 18' is increased by a predetermined amount to permit the Double Backer 20 to continue to operate until the Single Facer 10 or 10' has completed the splicing cycle and returned to its "normal" operating mode. After the bridge inventory has been built up to the desired level, in the "pre-splice" mode, the operator may place the Single Facer in the "splice" mode. In this latter mode, the speed of the Single Facer is smoothly and rapidly reduced to a low speed compatible with the splicing operation which is initiated by an appropriate signal from the computer when the roll of wed material 34 or 46 is almost exhausted. Upon completion of the splicing operation, the Single Facer may be returned to the "normal" mode. In this mode the Single Facer speed will again be related to the speed of the Double Backer once the bridge inventory has been re-established at the desired level.

Although it is necessary to perform a splice when the roll of liner or medium material is exhausted, it may also be desired to perform a so-called "mid-roll" splice to meet the specific requirements of the order schedule for the type of material to be processed. A "mid-roll" splice may be performed in the same manner as an "end of roll" splice upon initiation of the appropriate signal from the computer.

As noted above, the Double Backer is also capable of operating at an "end of order" or jog speed when productive operation is interrupted, for example, by an order change. In this mode, the entire process operates at the "end of order" speed until the operator returns the selector switch 90 on console 88 to "Normal".

Normally, it is possible to maintain the Double Backer at the desired speed through control of the speed of the Single Facer. However, under certain conditions it may be necessary to override the Double Backer set speed. For example, if the Single Facer is operating in the splice mode and the bridge inventory falls below its predetermined value, the "low bridge" signal, instead of causing an increase in the speed of the Single Facer, will cause the Double Backer to drop to a speed ten feet per minute less than the Single Facer splice speed. This "dive to save" mode prevents breakage of the web or improper splicing under extraordinary operating conditions. It will be appreciated that by dropping the Double Backer to a speed below the Single Facer splicing speed, the extraordinary "low bridge" condition will tend to be corrected. Moreover, since the splicing mode normally is of short duration, the loss of production due to such a cutback in the speed of the Double Backer is quite minimal.

It will therefore be appreciated that applicants have provided a flexible speed control system applicable to a web processing system involving a master unit and one or more slave units whereby the speed of the slave units is controlled by the speed of the master unit.

The terms and expressions which have been employed are used as terms of description and not of limitation and there is no intention, in the use of such terms and expressions, of excluding any equivalents of the features shown and described or portions thereof, but it is recognized that various modifications are possible within the scope of the invention claimed.

What is claimed is:

1. An apparatus for processing web material comprising a master unit for processing web material having a first drive means, said first drive means capable of driving said master unit at any speed within a predetermined range of speeds, said master unit being selectively operable at any one of a plurality of predetermined modes and at a range of speeds within at least one of said modes, at least one slave unit for processing web material having a second drive means, said second drive means capable of driving said slave unit at any speed within a predetermined range of speeds, each slave unit being selectively operable at any one of a plurality of predetermined modes and at a range of speeds within at least one of said modes, web storage means communicating between each master and slave unit, speed sensing means communicating with said master unit, speed sensing means communicating with each of said slave units, sensing means associated with each of said web storage means, computer means (a) to calculate a signal corresponding to a speed selected for said master unit within said predetermined range of speeds, (b) to compute a speed for each of said slave units corresponding to the speed selected for said master unit and the mode selected for each of said slave units and to provide a signal corresponding to said computed speed, (c) to compute a corrected speed for each of said slave units and to provide a signal corresponding thereto whenever the quantity of web material in the web storage means associated with said slave unit decreases to a predetermined quantity, output interface means between said computer means and each of said first and second drive means including a digital to analog converter, an optical isolation amplifier and a power amplifier, computer input interface means to select the mode and speed for the said master unit and computer input interface means to select the mode of operation of each slave unit.

2. An apparatus as set forth in claim 1 wherein the master unit is a Double Backer machine and each slave unit is a Single Facer machine.

3. An apparatus as set forth in claim 2 wherein the Single Facer machines are selectively operable in a normal mode, a pre-splice mode, a splice mode and an end of order mode and the Double Backer machine is selectively operable in a normal mode, an end of order mode and a dive to save mode.

4. An apparatus as set forth in claim 3 wherein the speed sensing means associated with the Double Backer and Single Facer machines are tachometer generators.

5. An apparatus as set forth in claim 3 wherein the digital to analog converter output is a direct current voltage in the range of 0 to 10 volts.

6. An apparatus as set forth in claim 3 wherein the final output direct current control voltage for the power amplifier is 0–75 volts floating on 1500 volt alternating current voltage with respect to earth ground.

7. An apparatus as set forth in claim 3 wherein the final output direct current control voltage for the power amplifier is 0–46 volts floating on a 0 volt alternating current voltage with respect to earth ground.

8. An apparatus as set forth in claim 3 wherein the final output direct current control voltage for the power amplifier is 0–20 volts floating on a 460 volt alternating current voltage with respect to earth ground.

9. A process for controlling the speed of web processing equipment including a master unit having a first drive means capable of driving said master unit at any speed within a predetermined range of speeds, at least one slave unit having a second drive means and a web storage means communicating between each slave unit and said master unit comprising selecting a speed for said master unit within said predetermined speed range, converting said speed first into a derived number and second into a binary number, further converting said binary number to an analog equivalent direct current voltage referenced to earth ground, converting said equivalent direct current voltage to an equivalent direct current voltage isolated from earth ground by light amplification means and capable of having an alternating current voltage offset from earth ground, amplifying said isolated direct current voltage to a direct current control voltage corresponding to the speed selected for said master unit, applying said direct current control voltage to said master unit first drive means, calculating a speed for each slave unit in binary notation corresponding to the said selected speed for said master unit in binary notation, converting said slave unit speed in binary notation to an analog equivalent direct current voltage referenced to earth ground, converting said equivalent direct current voltage to an equivalent direct current voltage isolated from earth ground by light amplification means and capable of having an alternating current voltage offset from earth ground, amplifying said isolated direct current voltage to a direct current control voltage corresponding to the speed calculated for said slave unit, applying said direct current control voltage to said slave unit second drive means, measuring the speed of the web material passing through said master unit, comparing the measured speed with the speed selected for said master unit, calculating a first error signal corresponding to the difference between said measured speed and said selected speed, converting said first error signal into an isolated amplified direct current control voltage to correct the speed of said master unit, measuring the speed of the web material passing through said slave unit, comparing the measured speed with the speed calculated for said slave unit, calculating a second error signal corresponding to the difference between said measured speed and said calculated speed and converting said second error signal into an isolated amplified direct current control voltage to correct the speed of said slave unit.

10. The process of claim 9 and the additional steps of sensing a signal from a web storage means sensor, calculating a third error signal corresponding to the signal received from said web storage means sensor, and converting said third error signal into an isolated amplified direct current control voltage to adjust the speed of the slave unit associated with said web storage means.

* * * * *